United States Patent
Jantzi et al.

(10) Patent No.: US 11,071,062 B2
(45) Date of Patent: Jul. 20, 2021

(54) SELECTING POWER CONSUMPTION MODES OF ELECTRONIC DEVICES

(71) Applicant: BlackBerry Limited, Waterloo (CA)

(72) Inventors: Jason Wayne Jantzi, St. Clements (CA); Mahendra Fuleshwar Prasad, Waterloo (CA); Rene Faurie, Versailles (FR); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/256,538

(22) Filed: Jan. 24, 2019

(65) Prior Publication Data

US 2019/0349858 A1 Nov. 14, 2019

(30) Foreign Application Priority Data

May 11, 2018 (WO) .................. PCT/IB2018/000605

(51) Int. Cl.
*H04W 52/02* (2009.01)
*H04W 76/28* (2018.01)
*G06F 1/3209* (2019.01)

(52) U.S. Cl.
CPC ...... *H04W 52/0235* (2013.01); *G06F 1/3209* (2013.01); *H04W 76/28* (2018.02)

(58) Field of Classification Search
CPC . H04W 16/26; H04W 52/0235; H04W 76/28; Y02D 30/00; Y02D 30/50; Y02D 30/70; G06F 1/3209
See application file for complete search history.

(56) References Cited

U.S. PATENT DOCUMENTS

| | | | |
|---|---|---|---|
| 10,715,652 B2* | 7/2020 | Baer | H04M 1/67 |
| 2011/0269463 A1* | 11/2011 | Wang | H04W 52/0232 455/436 |
| 2015/0304955 A1* | 10/2015 | Manepalli | H04W 52/0274 370/311 |
| 2016/0073284 A1 | 3/2016 | Qian | |
| 2016/0100362 A1* | 4/2016 | Palanisamy | H04W 72/042 370/311 |
| 2016/0205625 A1 | 7/2016 | Stojanovski | |
| 2016/0266634 A1* | 9/2016 | Chuang | G06F 1/3234 |
| 2017/0006549 A1* | 1/2017 | Deivasigamani | H04W 52/0245 |
| 2017/0041873 A1* | 2/2017 | Wu | H04W 52/0219 |

(Continued)

OTHER PUBLICATIONS

3GPP TS 23.401 V15.2.0, Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 15) (Dec. 2017) (404 pages).

(Continued)

*Primary Examiner* — Donald L Mills
(74) *Attorney, Agent, or Firm* — Trop, Pruner & Hu, P.C.

(57) ABSTRACT

An electronic device includes a storage to store a plurality of profiles relating to respective different operation modes of the electronic device, the plurality of profiles specifying different power consumption modes. At least one processor is configured to determine a given use case of the electronic device, and select a power consumption mode of the electronic device using a given profile selected from among the plurality of profiles based on the a given operation mode.

17 Claims, 6 Drawing Sheets

(56) References Cited

U.S. PATENT DOCUMENTS

| | | | |
|---|---|---|---|
| 2017/0339639 A1* | 11/2017 | Stojanovski | H04W 52/0229 |
| 2018/0124544 A1 | 5/2018 | Gupta | |
| 2018/0314314 A1* | 11/2018 | Link, II | G06F 1/3209 |
| 2019/0037488 A1* | 1/2019 | Wang | H04W 52/0216 |
| 2019/0297577 A1* | 9/2019 | Lin | H04W 52/0219 |
| 2019/0364492 A1* | 11/2019 | Azizi | H04W 52/0264 |
| 2020/0084724 A1* | 3/2020 | Cha | H04W 4/20 |

OTHER PUBLICATIONS

3GPP TS 24.301 V15.1.1, Technical Specification, 3rd Generation Partnership Project; Technical Specification Group Core Network and Terminals; Non-Access-Stratum (NAS) protocol for Evolved Packet System (EPS); Stage 3 (Release 15) (Jan. 2018) (507 pages).

GSM Association, Official Document CLP.28—NB-IoT Deployment Guide to Basic Feature set Requirements, Version 1.0, Aug. 2, 2017 (30 pages).

GSMA Mobile IoT, 3GPP Low Power Wide Area Technologies, GSMA White Paper downloaded Mar. 11, 2018 (49 pages).

Keysight Technologies, NB-IoT and LTE Cat M1 Field Measurements and SLA Verification, Application Note, Jan. 17, 2019 (7 pages).

GSMA, Long Term Evolution for Machines: LTE-M downloaded Jan. 26, 2018 (5 pages).

Nokia, LTE evolution for IoT connectivity, Nokia white paper, 2017 (18 pages).

Ericsson White paper, Uen 284 23-3278, Cellular Networks for Massive IoT, Jan. 2016 (13 pages).

Wikipedia, Universal asynchronous receiver-transmitter last edited Jan. 3, 2018 (12 pages).

Wikipedia, USB last edited Mar. 9, 2018 (53 pages).

European Patent Office, International Search Report for PCT/IB2018/000605 dated Nov. 29, 2018 (5 pages).

European Patent Office, Written Opinion of the International Searching Authority for PCT/IB2018/000605 dated Nov. 29, 2018 (9 pages).

\* cited by examiner

SELECTING POWER CONSUMPTION MODES OF ELECTRONIC DEVICES

CROSS-REFERENCE TO RELATED APPLICATION

This application claims the benefit of International Appl. No. PCT/IB2018/000605, filed May 11, 2018, which is hereby incorporated by reference.

BACKGROUND

Electronic devices are able to connect to wireless networks to perform data communication. Some electronic devices can be powered using batteries. A battery of an electronic device can deplete quickly if the electronic device is run at a high power consumption level.

BRIEF DESCRIPTION OF THE DRAWINGS

Some implementations of the present disclosure are described with respect to the following figures.

Figure 1:
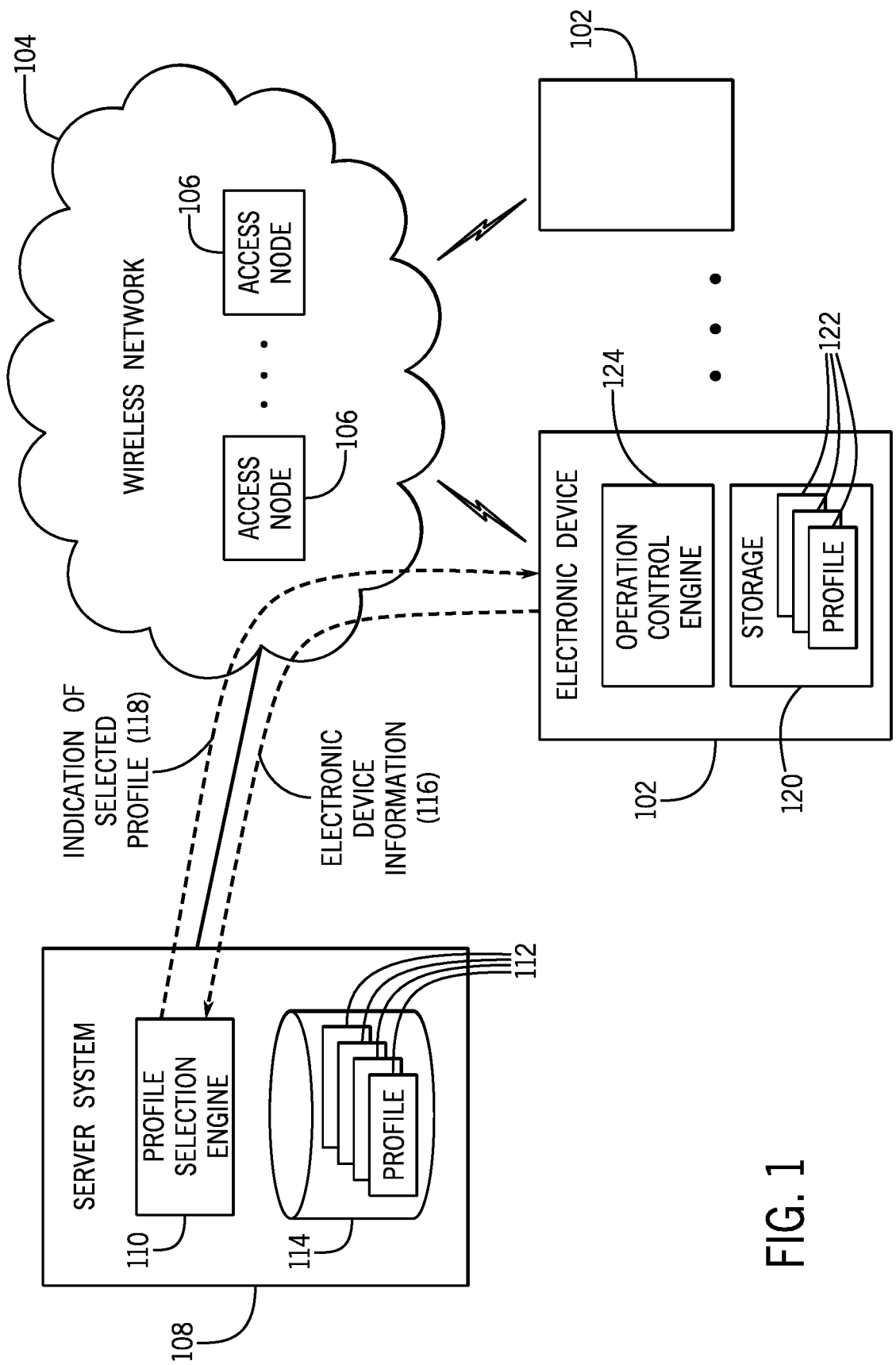
FIG. 1 is a block diagram of an example arrangement including a wireless network, a server system, and electronic devices according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Different types of electronic devices can communicate over wireless networks. Some electronic devices are referred to as Internet of Things (IoT) devices, such as sensor devices, cameras, thermostat devices, vehicle components, and so forth. More generally, an IoT device is a type of electronic device that is not designed for general computing tasks such as computers. Rather, an IoT device has a specified functionality (or set of functionalities), and the IoT device is capable of transmitting and/or receiving data over a wireless network.

Although reference is made to IoT devices in some examples, it is noted that in other examples, techniques or mechanisms according to some implementations of the present disclosure are applicable to other types of electronic devices, including notebook computers, desktop computers, tablet computers, smartphones, wearable devices (e.g., smart watches, smart eyeglasses, head-mounted devices, etc.), game appliances, home appliances, and so forth.

Wireless networks can include cellular networks. In some examples, cellular networks can operate according to the Long Term Evolution (LTE) standards as established by the Third Generation Partnership Project (3GPP).

3GPP has also provided low power cellular technologies, referred to as low power wide area (LPWA) technologies, for low power devices, such as IoT devices. Examples of such technologies are provided by the Long Term Evolution for Machines (LTE-M) standards that allow for cellular connection to a cellular network by IoT devices. LTE-M is also referred to as eMTC. LTE Cat-M1 and Cat-M2 are LTE-M example device categories. A different type of low power cellular technology is referred to as LTE Narrow Band (NB)-IoT. Cat-NB1 and Cat-NB2 are NB-IoT example device categories.

Another different type of low power cellular technology is the Extended Coverage-Global System for Mobile (GSM)-IoT (EC-GSM-IoT) technology.

Generally, IoT devices use less bandwidth and lower power and consumes lower system resources, and can accept higher transmit and receive latencies in some cases. Additionally, IoT devices can have lower quality-of-service (QoS) requirements than other electronic devices.

Electronic devices, such as IoT devices, can have different types of operation modes. An "operation mode" can refer to a context, environment, or condition of an electronic device. An example of an operation mode is a use case of an electronic device. For example, different operation modes can correspond to different motion conditions of an electronic device. A first operation mode corresponds to the electronic device being stationary, while a second operation mode corresponds to the electronic device being in motion. Moreover, different speeds of the electronic device can correspond to different operation modes (e.g., high speed operation mode, low speed operation mode, etc.). As another example, an operation mode can be based on whether or not a door or other barrier of a vehicle (e.g., a car, a truck, a watercraft, an aircraft, a spacecraft, etc.) or a cargo transportation unit (e.g., a container, a trailer, a platform, etc.) is open or closed. In addition, different operation modes can correspond to different modes of transportation, such as transportation through the air, transportation by sea, transportation on rail, transportation on the road, and so forth.

As another example, an operation mode can correspond to an operation mode in which an electronic device is being updated over-the-air (OTA). As yet a further example, another operation mode can refer to an emergency operation mode, in which an emergency condition exists (e.g., a vehicle has been involved in a crash, an airbag of a vehicle has deployed, a vehicle has tipped over, etc.).

Electronic devices can have other operation modes in other examples.

In the different operation modes, an electronic device can benefit from using different values of parameters, such as power consumption parameters that control power consumption modes, network parameters associated with network operation of the electronic device, and/or other parameters. A power consumption parameter or a collection of power consumption parameters can control a power consumption mode of the electronic device. Various example power consumption modes are discussed further below.

Network parameters can control how electronic devices establish network connections or communicate data with a wireless network. Other types of parameters can control other characteristics of electronic devices.

In accordance with some implementations of the present disclosure, an electronic device can select its power consumption mode based on an operation mode of the electronic device, and based on use of a selected profile (as selected from multiple profiles by a server system). In addition, the electronic device can select settings for other parameters based on the operation mode of the electronic device, and on the selected profile.

FIG. 1 is a block diagram of an example arrangement that includes electronic devices 102 that are wirelessly connected to a wireless network 104. In some examples, the wireless network 104 can be a cellular network that operates according to an LPWA technology. In other examples, the wireless network 104 can operate according to different wireless technologies, including the LTE technology, the Wi-Fi technology, a 5$^{th}$ generation (5G) wireless technology, and so forth.

The wireless network 104 includes access nodes 106. An access node 106 allows an electronic device 102 to establish a connection with the wireless network 104, so that the electronic device 102 can perform a communication with another endpoint device, such as a server system 108 or a different endpoint device. In a cellular network, an access node 106 can include a base station, such as an evolved NodeB (eNodeB) for a cellular network that operates according to LTE, LTE-M or LTE NB-IoT (as examples), or another type of base station for other types of cellular networks, an access point (AP) in a Wi-Fi network, and so forth.

The server system 108 can be implemented using a computer or multiple computers (which can be implemented as a web server, a cloud system, and so forth). The server system 108 includes a profile selection engine 110 that is able to select a profile from among multiple profiles 112 stored in a profile repository 114, for use by a given electronic device 102.

As used here, an "engine" can refer to a hardware processing circuit, such as any or some combination of the following: a microprocessor, a core of a multi-core microprocessor, a microcontroller, a programmable integrated circuit device, a programmable gate array, or any other hardware processing circuit. Alternatively, an "engine" can refer to a combination of a hardware processing circuit and machine-readable instructions executable on the hardware processing circuit.

A "profile" can refer to any collection of information that can be used to control a state of an electronic device 102. For example, a profile can include a set of parameters and any other information that control a state of an electronic device. In some examples, a profile may be referred to as an "operation mode profile." In other examples, a profile may be referred to as an "power consumption mode profile."

The profile repository 114 can be implemented using a storage device or a number of storage devices, which can be part of the server system 108 or can be external of but accessible by the server system 108.

The profile selection engine 110 may receive wireless device information 116, such as from an electronic device 102 (or multiple electronic devices 102). Based on the electronic device information 116 (e.g., one or more of network or network node information, tracking area information, signal measurement information, information indicating support for certain power consumption modes, etc.), the profile selection engine 116 is able to determine an operation mode of the electronic device 102, and can select a profile from among the profiles 112 for use by the electronic device 102. The profile selection engine 110 can send an indication of the selected profile (118) to the electronic device 102.

As shown in FIG. 1, an electronic device 102 includes a storage 120, which stores a number of profiles 122 that have been previously transmitted by the server system 108 to the electronic device 102. Alternatively or in combination, part or all of the profiles 122 in the storage 120 of the electronic device 102 can be preconfigured, preloaded or provisioned without the need to have them transmitted from the server system 108. The profiles 122 in the storage 120 of the electronic device 102 can include all or a subset of the profiles 112 in the profile repository 114 of the server system 108.

Based on the indication of the selected profile (118) received from the profile selection engine 110, an operation control engine 124 in the electronic device 102 selects a power consumption mode from among multiple possible power consumption modes to use for the electronic device 102. The operation control engine 124 can also select other settings, such as settings corresponding to different network parameters, for use by the electronic device 102 based on the selected profile from the profile selection engine 110.

Alternately, the profile selection engine 110 may select a plurality of profiles among the profiles 112 to be used by the electronic device 102. The profile selection engine 110 can send an indication of the plurality of selected profiles (118) to the electronic device 102. The electronic device 102 may then select the profile to be used at a given moment within the plurality of profiles, depending on further information communicated by the server system 108 and/or on other information available at the electronic device 102, such as location information, network parameters, sensor information, environmental conditions, and/or priorities configured for each profile in the plurality of profiles.

Figure 2:
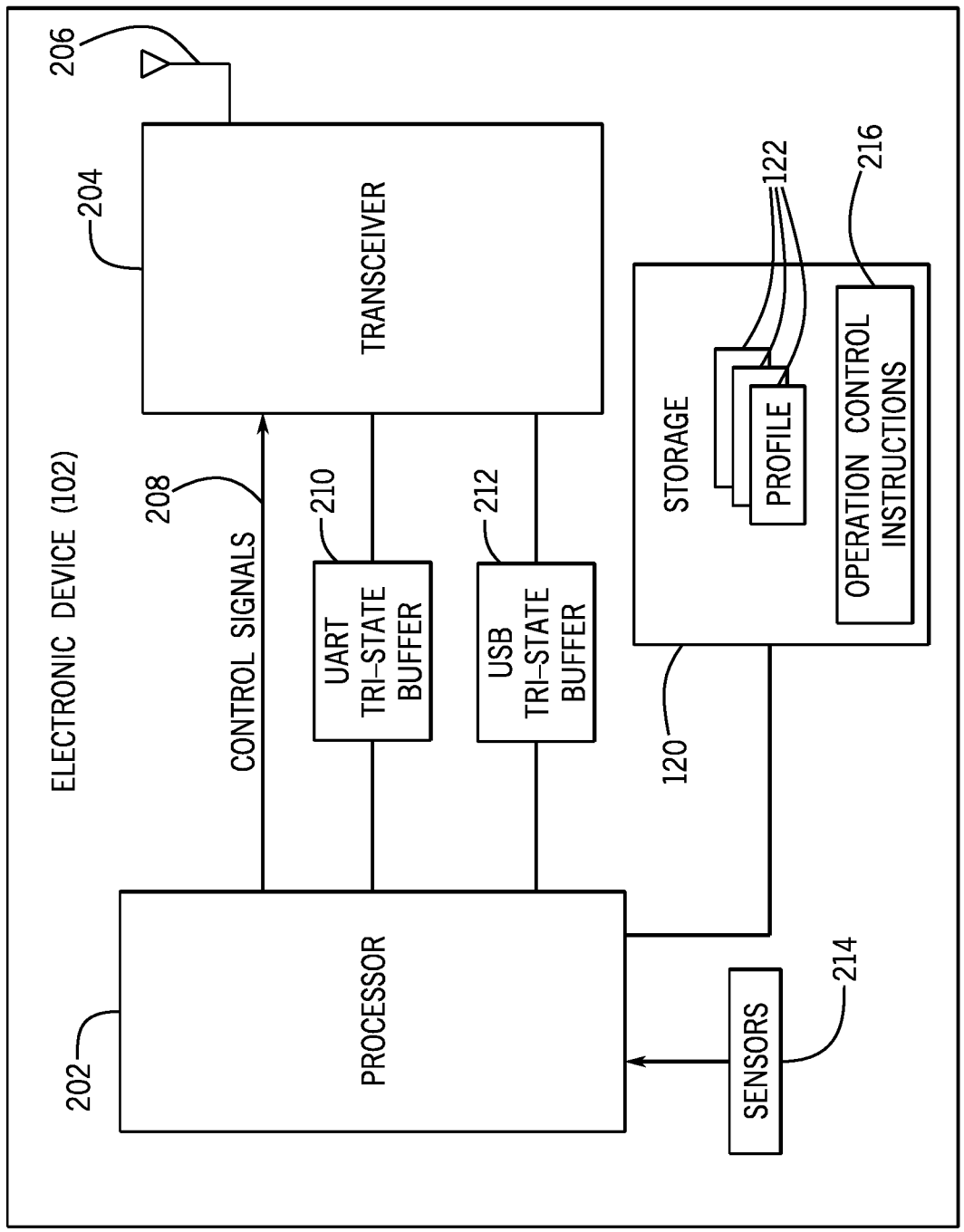
FIG. 2 is a block diagram of an electronic device 102 according to some examples.

FIG. 2 is a block diagram of an example electronic device 102. The electronic device 102 includes a processor 202, which can include any or some combination of the following: a microprocessor, a core of a multi-core microprocessor, a microcontroller, a programmable integrated circuit device, a programmable gate array, or any other type of hardware processing circuit.

The electronic device 102 further includes a communication transceiver 204 (also referred to as a "modem") that allows the electronic device 102 to communicate over a wireless network, such as the wireless network 104 of FIG. 1. The transceiver 204 includes an antenna 206 to transmit and receive wireless signals.

The processor 202 and the transceiver 204 are coupled to each other through various circuitry, including communication lines to allow the processor 202 to issue control signals 208 to the transceiver 204, and/or tri-state buffers 210 and 212. Examples of the control signals 208 include a power control signal to control whether or not power is on or off at the transceiver 204, a reset signal to reset the transceiver 204, a wake signal to wake the transceiver 204 from a sleep state to an operational state, and so forth.

The tri-state buffers 210 and 212 are provided to isolate interface signals between the domain of the processor 202 and the domain of the transceiver 204. The presence of the tri-state buffers 210 and 212 allow the processor 202 and the transceiver 204 to operate independently of one another. For example, the processor 202 can be in one power mode while the transceiver 204 can be in a different power mode. The presence of the tri-state buffers 210 and 212 prevent electrical current from flowing from one domain to the other domain while the processor 202 and the transceiver 204 are in different power modes, to reduce the amount of current usage in the electronic device 102.

In some examples, the tri-state buffers include a universal asynchronous receiver-transmitter (UART) tri-state buffer 210 and a Universal Serial Bus (USB) tri-state buffer 212. UART supports asynchronous serial communication between the processor 202 and the transceiver 204. USB is a protocol that provides for a different interface between the processor 202 and the transceiver 204. Although specific example protocols (UART and USB) are shown, it is noted that in other examples, other types of interfaces can be provided between the processor 202 and the transceiver 204.

The electronic device 102 also includes various sensors 214. The sensors 214 can include, as examples, any or some combination of the following: a position sensor to detect a position of the electronic device 102 (such as a Global Navigation Satellite System or GNSS based sensor or other type of position sensor), a door sensor (such as an accelerometer and/or a gyroscope to detect whether a door or other barrier is open or closed), a cargo load sensor (such as a time-of-flight or ToF sensor to detect an amount of cargo loading in a vehicle or cargo transportation unit), an environment sensor (e.g., a temperature sensor, a pressure sensor, a humidity sensor, etc.), and so forth. The output of the sensors 214 can be received by the processor 202.

The storage 120 of the electronic device 102 is coupled to the processor 202. The storage 120 stores the profiles 122 as well as operation control instructions 216, which are machine-readable instructions executable on the processor 202 to perform the tasks of the operation control engine 124 of FIG. 1.

Different Power Consumption Modes

The following describes examples of possible different consumption modes that can be used by an electronic device 102. Different profiles (such as profiles 112 and 122 in FIG. 1) can relate to respective different operation modes of an electronic device. In some examples, a profile can be related to one operation mode, or can be related to multiple operation modes. As another example, one operation mode may employ multiple different profiles.

The profiles can specify different power consumption modes. A profile can specify one power consumption mode, or alternatively, a profile can specify multiple different power consumption modes. Alternatively, the same power consumption mode can be specified by multiple different profiles.

The following describes the several different example power consumption modes: an on-off mode, a power save mode (PSM), an extended discontinuous reception (eDRX) mode, and a combined PSM and eDRX mode. Although specific power consumption modes are discussed, it is noted that in other implementations of the present disclosure, additional or alternative power consumption modes can be employed.

The different power consumption modes may provide different benefits and disadvantages. Thus, depending upon the operation mode of an electronic device, one power consumption mode may be more beneficial than another power consumption mode, in terms of power consumption reduction, performance enhancement, and so forth.

Generally, in a low power mode, the on-off mode powers off the processor 202 and the transceiver 204 and the device is deregistered from the network, the PSM mode enables powering off all or of most of the transceiver 204 components but maintains the electronic device 102 registered with the network, and the eDRX mode causes the transceiver 204 to be activated every specified period from an inactive state to receive information from the wireless network 104.

On-Off Mode

The on-off mode is a mode where the processor 202 and the transceiver 204 are either both on or both off. For example, during a bootup procedure of the electronic device 102 upon power being applied to the processor 202 and the transceiver 204, both the processor 202 and the transceiver 204 are turned on. Also, during establishment of a data connection with the wireless network 104, both the processor 202 and the transceiver 204 are turned on. Additionally, while data communication is being performed between the electronic device 102 and the wireless network 104, both the processor 202 and the transceiver 204 are turned on.

Figure 3:
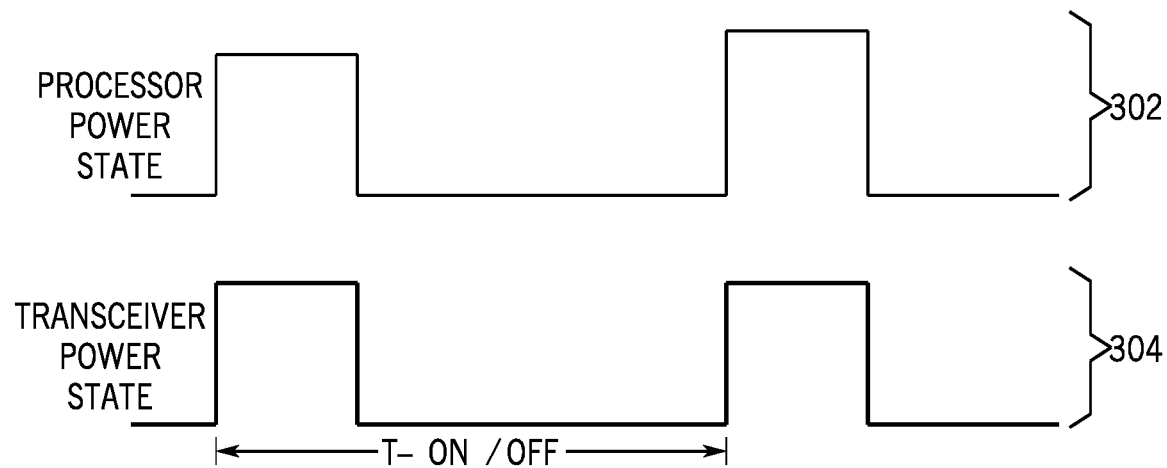
FIG. 3 is a timing diagram showing an example on-off mode of an electronic device.

FIG. 3 shows example timing diagrams 302 and 304 that depict the processor power state and the transceiver power state, respectively. A curve 302 or 304 being at a high power state indicates that the processor 202 or transceiver 204 is on, while a curve 302 or 304 at a low power state indicates that the processor 202 or transceiver 204 is off.

With the on-off mode, both the processor 202 and transceiver 204 are draining power throughout bootup, throughout a data connection or during periods of time when the power state is on. During times when the transceiver 204 is on, the processor 202 cannot be placed into a sleep state (or other lower power mode) in the on-off mode.

The transceiver 204 (and thus correspondingly the processor 202) can be turned off when data does not have to be communicated. Turning off the transceiver 204 (which involves a full power down procedure of the transceiver 204) may result in a network detach procedure where the transceiver 204 terminates a network connection with the wireless network 104. As a result, the wireless network 104 (more specifically, an access node 106 in the wireless network 104) may indicate that the electronic device 102 has detached from the wireless network 104.

If the transceiver 204 is turned on (i.e. powered on) again after being turned off, there can be a relatively long bootup time of the transceiver 204 (e.g., many seconds). Additionally, when the transceiver 204 is turned on from an off state, a network attach procedure may be performed to establish a connection with the wireless network 104, which can take a relatively long time.

The on-off mode may not be ideal under certain conditions, such as an expected duration of a data communication, and whether the data communication includes a mobile originated (MO) call only or both mobile originated and mobile terminated (MT) calls. If an MO call is expected, and the expected duration is large, then the on-off mode may provide god performance. However, if an MO call is expected but the duration is not large, then a PSM mode may be preferable. As another example, if an MT call is expected then an eDRX mode may be considered.

For examples where the electronic device 104 is used for a service with long inactivity periods between phases of data communications, then the on-off mode may be beneficial, since it may reduce overall power consumption of the electronic device 102, provided the overall latency due to bootup and network establishment phases remains acceptable for the considered service.

PSM Mode

The PSM mode allows the electronic device 102 to determine how often and long the electronic device 102 is active to transmit and receive data. In the PSM mode, the transceiver 202 can be kept off while the electronic device 102 remains registered (attached) with the wireless network 104. As a result, the electronic device 102 does not have to reattach or re-establish a packet data network (PDN) connection when transitioning from a lower power mode to a higher power mode and reconnecting to the wireless network 104.

Figure 4:
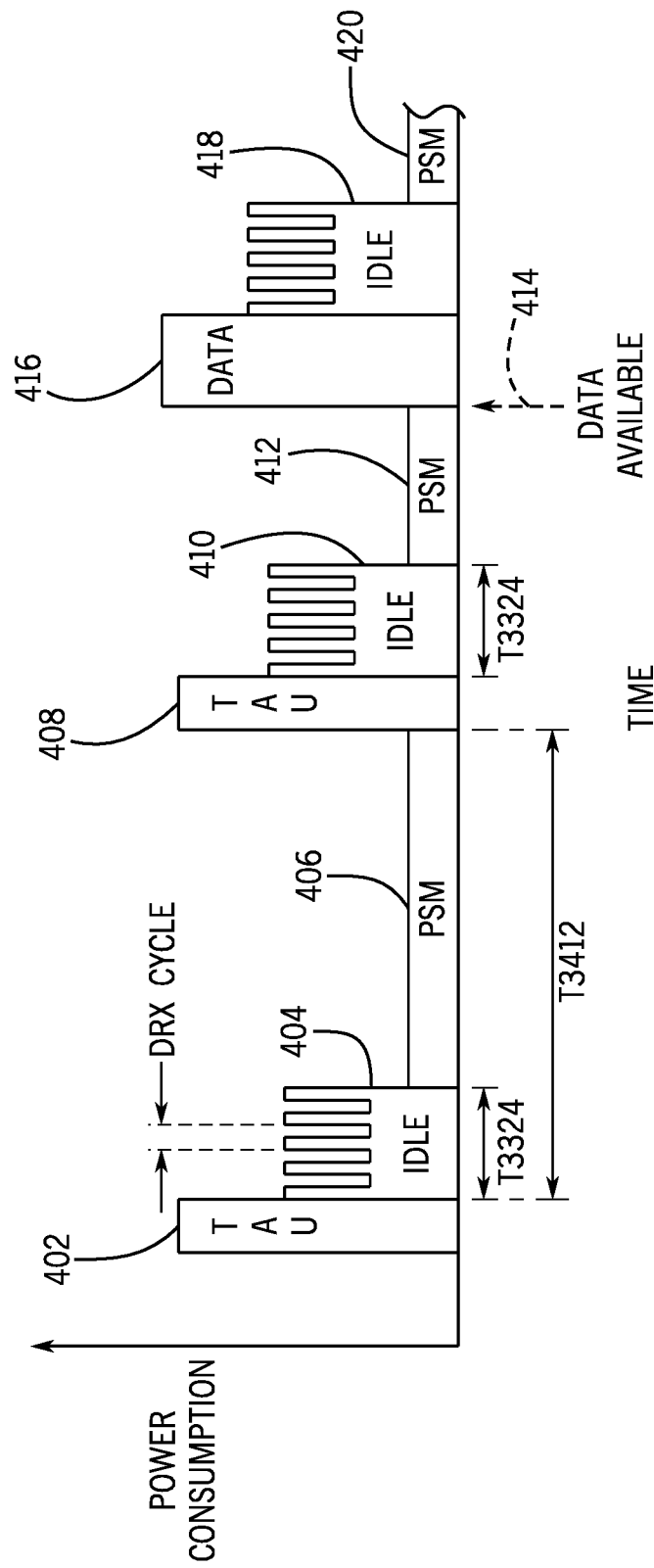
FIG. 4 is a timing diagram showing an operation of an electronic device that includes a transition to a power save mode (PSM).

FIG. 4 shows an example timing diagram that illustrates power consumption of the transceiver 204 over time. The electronic device 102 performs a tracking area update (TAU) 402 in response to various events, such as the electronic device 102 moving to a new tracking area (TA) that is not included in a list of tracking areas with which the electronic device 102 is registered, upon expiration of a specific timer, referred to as a T3412 (TA Update Timer) as specified in 3GPP Technical Specification (TS) 24.301, and so forth. During a TAU, the power consumption of the transceiver 204 is relatively high.

Following the completion of the TAU 402, the transceiver 204 enters into an idle state 404, in which the transceiver 204 operates in a regular discontinuous reception (DRX) mode. In the regular DRX mode (which is different from the eDRX mode discussed further below), the transceiver 204 is able to turn on and off its radio receiver on a periodic basis. A DRX cycle includes a receiver on time period and a receiver off time period. When the receiver is off, the receiver of the transceiver 204 is unable to monitor a paging channel and receive incoming signaling from the wireless network 104. Otherwise, if the receiver of the transceiver 204 is on, then the receiver is able to receive an incoming signal.

A length of time when the transceiver 204 is in the DRX mode can be controlled by a specified timer, such as a T3324 timer as specified in 3GPP TS 24.008. Following the DRX mode period, the transceiver 204 enters into a sleep state (referred to as PSM state 406), where the transceiver 204 is in a low power state while remaining registered with the wireless network 104.

The transceiver 204 performs another TAU 408 upon expiration of the T3412 timer. Following the TAU 408, the transceiver 204 enters an idle state 410 where the transceiver 204 is in the regular DRX mode, then enters into a PSM state 412, and so on. When data is available for transmission (414), the transceiver 204 transitions to a higher power state to transmit the data (416). Following transmission of the data, the transceiver 204 enters an idle state 418, and then a PSM state 420. Transmission of available data may also be combined with a TAU such as TAU 402 or TAU 408.

In the PSM state (406, 412, or 418), the electronic device 102 is not reachable from the wireless network 104 (e.g., for a mobile-terminated connection where a connection is requested or initiated by the wireless network 104). However, the electronic device 102 can trigger a wakeup and a data connection, such as in response to expiration of the T3412 timer, to perform a TAU, or in response to detecting availability of data to transmit, and so forth.

The T3412 timer length is configurable, such as by the server system 108 or a different server, depending on the operation mode or selected profile. For example, if the electronic device 102 is stationary for a short period of time (such as when a vehicle or a cargo transportation unit to which the electronic device 102 is attached is loading cargo), it may be advantageous to increase the length of the T3412 timer, up to a specified maximum time length. The device may request a particular value of T3412.

Also, the T3324 timer that controls the length of time of a DRX mode is programmable by the server system 108 or a different server. For example, the time interval specified by the T3324 timer is the time the electronic device 102 listens to a paging channel after having transitioned from connected to idle mode. So for some operation modes (e.g., loading and unloading cargo), it may be beneficial to adjust this parameter. The device may request a particular value of T3324.

The server system 108 (or another server) can notify the electronic device 202 of geographical areas and PLMNs where the PSM mode is supported and geographical areas and PLMNs where the PSM mode is not supported.

eDRX Mode

Similar to the DRX mode, the eDRX mode has a DRX cycle. However, the time length of an inactive portion of the DRX cycle of the eDRX mode may be longer than the inactive portion of the DRX cycle of the DRX mode.

Figure 5A:
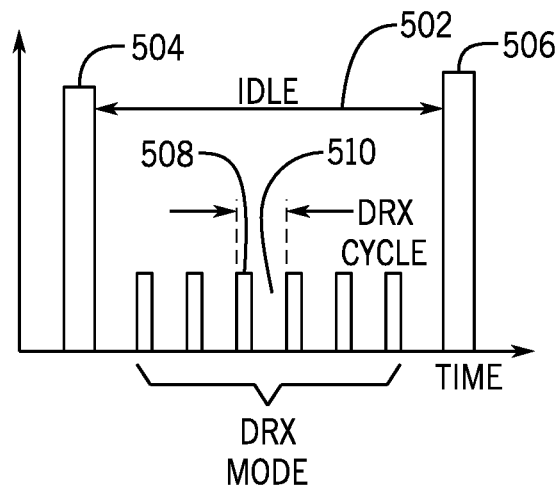
FIG. 5A is a timing diagram showing an operation of an electronic device that includes a regular discontinuous reception (DRX) mode.

FIGS. 5A an 5B illustrate the difference between the DRX mode and the eDRX mode. In FIG. 5A, an idle period 502 is provided between active periods 504 and 506, where in these active periods the transceiver 204 is on and performing an operation, such as a TAU, a data transmission, and so forth. In the idle period 502, the transceiver 204 is in the regular DRX mode, which has a DRX cycle that includes an active portion 508 when the receiver of the transceiver 204 is on and able to monitor a paging channel and receive incoming signaling, and an inactive portion 510 when the receiver of the transceiver 204 is off and unable to receive an incoming signal.

Figure 5B:
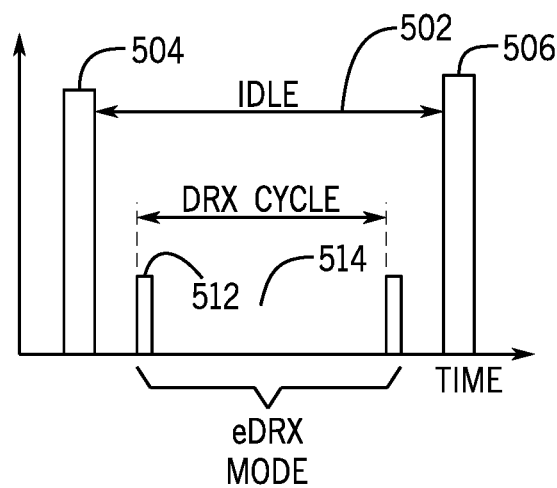
FIG. 5B is a timing diagram showing an operation of an electronic device that includes an extended discontinuous reception (eDRX) mode.

In FIG. 5B, in the idle period 502, the transceiver 204 is in the eDRX mode, which includes an active portion 512 where the receiver of the transceiver 204 is on and able to receive an incoming signal and inactive portion 514 where the receiver of the transceiver 204 is off and unable to receive an incoming signal. As shown in FIG. 5B, the inactive portion 514 of the DRX cycle of the eDRX mode is much longer than the inactive portion 510 of the DRX cycle of the regular DRX mode shown in FIG. 5A.

A difference between the eDRX mode and the PSM mode is that in the eDRX mode the electronic device 102 is reachable by the wireless network 104 (during the active portion of the DRX cycle of the eDRX mode), e.g., to establish an MT connection and further receive MT data. In the eDRX mode, the electronic device 102 has a delayed reachability compared to when operated in a regular DRX mode.

The processor 202 can be kept off while the transceiver 204 is in the eDRX mode. The eDRX mode may be employed for operation modes of the electronic device 102, where MT communications are expected.

The server system 108 (or another server) can notify the electronic device 202 of geographical areas and PLMNs where the eDRX mode is supported and geographical areas and PLMNs where the eDRX mode is not supported.

The PSM mode may consume less energy than the on-off mode and the eDRX mode.

Combined Mode

It may also be beneficial for the electronic device 102 to request to enable a combination of multiple power consumption modes, such as a combination of both the eDRX mode and the PSM mode, depending on the operation mode of the electronic device 102. The combined eDRX and PSM mode allows the electronic device 102 to selectively enter the eDRX mode and the PSM mode. For example, FIG. 4 can be modified so that during each idle state the electronic device 102 enters the eDRX mode instead of the regular DRX mode.

The server system 108 or another server may indicate whether the combined eDRX mode and the PSM mode is available.

Although reference is made to a combined mode that is a combined eDRX and PSM mode, it is noted that in other examples, other combined modes that combines other power consumption modes can be used.

Profile Selection at the Device Based on Prioritization or Other Conditions

In some examples, an electronic device 102 can be pre-configured or provisioned with multiple profiles associated with preferences or priorities, and the electronic device 102 can select a profile and the corresponding power consumption mode to use depending on the preferences or priorities, on local network capabilities or on other conditions that can be determined locally at the electronic device 102 and without requiring further interactions with the server.

The server system 108 can preconfigure the electronic device 102 with a plurality of allowed profiles, the plurality of profiles indicating, e.g., one or more of the on-off mode, PSM mode, eDRX mode, combined eDRX and PSM mode, or a subset or a superset of these modes, as examples. The server system 108 can associate preferences or priorities with each of the allowed power consumption modes. In a more specific example, the electronic device 102 can be configured with a profile indicating eDRX mode associated to a highest priority, a profile indicating the PSM mode associated to the next highest priority, a profile indicating the on-off mode associated to the lowest priority. In other examples, the electronic device 102 may be configured with different profiles and different associated priorities.

The following provides some specific examples.

The electronic device 102 may be configured with a list of the three following supported profiles and power consumption modes, and associated priorities:
  Profile 1 (eDRX): priority p1 (highest);
  Profile 2 (PSM): priority p2 (medium);
  Profile 2 (On-off): priority p3 (lowest).

The electronic device 102 may additionally be configured with one or more timers such as T-eDRX, T3324, T3412 or T-ON/OFF timers, or with other parameters relevant to the considered operation modes. The timer T-eDRX specifies the DRX cycle period of the eDRX mode (shown in FIG. 5B), the T3324 and T3412 timers are described in connection with the PSM mode operation (shown in FIG. 4), and the T-ON/OFF timer specifies the cycle period (shown in FIG. 2) of the on-off mode. These parameters may be included in the corresponding profiles.

In the above example, when the electronic device 102 awakens from the PSM mode or from the off state of the on-off mode, the electronic device 102 checks whether the eDRX mode, associated to a higher configured priority, is supported in a current region (e.g., current cell) of the wireless network 104 based on system information (e.g., system information blocks or SIBs) broadcast by the wireless network 104. If the current region of the wireless network 104 supports the eDRX mode, the electronic device 102 may signal to the wireless network 104 the electronic device's preferred eDRX parameters (e.g., paging time window length, eDRX cycle length, etc.) according to the applicable 3GPP procedures (e.g., TAU as specified in 3GPP TS 23.401 and TS 24.301) based on the values configured by the server system 108. The electronic device 102 can then transition to the eDRX mode.

At cell (re)selection (in which the electronic device 102 selects or reselects a new cell), the electronic device 102 can determine the power consumption modes supported in the new cell, and similarly the electronic device 102 acts according to the list of supported features and the configured prioritization and parameters.

The electronic device 102 may determine the allowed profiles, hence the power consumption modes, either by direct information provided by the wireless network 104 (e.g., eDRX parameters), by a learning process (e.g., based on past success or failure of an electronic device 102 in using a profile and selecting the corresponding power consumption mode, such as successful/failed attempt to request the PSM mode or the eDRX mode) and/or with server system 108 assistance.

In response to determining that the wireless network 104 supports a given power consumption mode, the electronic device 102 may obtain, over the wireless network 104, a set of one or more parameter values for the given power consumption mode, such as the timer values for the PSM mode and the eDRX mode, if these parameters are not included in the associated profile and are not already known to the electronic device 104.

In further examples, such profile and associated power consumption mode selection with prioritization as discussed above may be enhanced by a number of options or features that can be implemented alternatively or in combination, for example (but not limited to):

Additionally or alternatively, the selection of the profile and of the associated power consumption mode to use may be made dependent on operating parameters or conditions, for example, radio conditions or link budget, the timers or cycle values assigned by the wireless network 104, the location of the electronic device 102, the velocity of the electronic device 102, the mobile network operator (MNO) of the wireless network 104, current battery conditions of a battery of the electronic device 102, the type of data operation (e.g. periodic status update, OTA update, etc.) performed by the electronic device 102, and so forth.

The priorities can be applied in a weighted manner depending on operating parameters or conditions, e.g., some specified algorithm may modify the priority value associated with a given profile and the associated power consumption mode depending on the estimated battery lifetime of the electronic device 102, or depending on one or more operating parameters or conditions.

The use of combined power consumption modes may be allowed.

In further examples, a given power consumption mode may be associated with multiple operational parameter values sets, e.g., multiple values for timers, and the electronic device 102 can select the operation mode and a specific operational parameter values set to use depending on preferences or priorities, on local network capabilities or on other conditions that can be determined locally at the electronic device 102. In further examples, a given power consumption mode and an associated operational parameter values set can be configured, stored or identified as a specific power consumption mode profile. Different profiles may refer to the same power consumption mode and different associated operational parameter values sets.

Example Operation Modes

The following refers to various example operation modes of electronic devices 102, which can be related to services provided to logistics companies or may be related to asset tracking (such as tracking cargo transportation units, vehicles, etc.). Although various example operation modes are listed, it is noted that in other examples, additional or alternative operation modes can be used.

Example 1: Device in Motion with Lower Frequency Updates

In an example operation mode, an electronic device 102 is in motion on a road moving across a long distance (such as on a highway or freeway), and thus the electronic device 102 may only have to provide updates to the server, e.g. providing its location, infrequently. Infrequent server updates may be performed in scenarios where the electronic device 102 is attached to a vehicle or cargo transportation unit that is carrying lower value cargo. In such an operation mode, it may make sense to use the electronic device 102 in the PSM mode.

In the PSM mode, the electronic device 102 can awaken periodically (such as based on expiration of a timer) or can be triggered to be awakened to check in to receive the updates. Timers that control the PSM mode can vary based on different operation modes.

Example 2: Device in Motion with Higher Frequency Updates

In another example operation mode, an electronic device 102 is in motion on a road moving across a long distance, and is attached to a vehicle or a cargo transportation unit carrying, for example, higher value cargo (e.g., perishable items, expensive items, etc.). In such an operation mode, the electronic device 102 may have to provide location report updates more frequently, and may also need to receive mobile-terminated connections. In this example operation mode, the electronic device 102 can be operated using the eDRX mode.

In this way, a dispatcher or an automated entity can see the electronic device 102 in almost real time and can initiate any changes remotely, such as from a server. In the eDRX mode, updates can be received by the electronic device 102 with relatively low latency.

Example 3: Stationary Device/No Motion

Another example operation mode is when the electronic device 102 is stationary or not in motion for a relatively long period of time. For example, the electronic device 102 may be attached to a vehicle or cargo transportation unit that is parked in the yard warehouse over the weekend or parked for an extended period of time if not in active use. In this example operation mode, the electronic device 102 may be operated in the on-off mode.

When the electronic device 102 awakens from the off state of the on-off mode, the electronic device 102 would have to establish a new connection with the wireless network 104. However, since both the processor 202 and the transceiver 204 of the electronic device 102 are off in the off state, power consumption is reduced.

Example 4: Changing Temperature/Reading Sensor Data from the Server Side

Another example operation mode involves a scenario where the electronic device 102 is to be updated frequently (e.g., on a semi-real time basis). For example, a dispatcher or an automated entity may wish to update the settings of at least some sensors 214 (FIG. 2) of the electronic device 102 frequently. As another example, cargo of a refrigerated or heated vehicle or cargo transportation unit to which the electronic device 102 may be loaded or unloaded. Following the loading or unloading of the cargo in such a scenario, it may be desirable to change a setting in the refrigerated or heated vehicle or cargo transportation unit (e.g., to increase or decrease an environmental set-point to control the environmental condition, such as temperature, humidity, etc., of the refrigerated or heated vehicle or cargo transportation unit). For example, a time-of-flight (ToF) sensor can be used to detect cargo loading or unloading. A ToF sensor includes a signal emitter (e.g., a light emitter) that emits a signal (e.g., light) that is then reflected from a surface inside the vehicle or cargo transportation unit, where the surface can be a surface of a cargo (if loaded) or of a wall of the vehicle or cargo transportation unit (if not loaded with cargo). The reflected signal is received by a signal receiver (e.g., light detector) which can then determine a time of flight of the signal to determine whether or not cargo is present.

In such an example operation mode where frequent updates of the electronic device 102 are performed, the electronic device 102 can be operated using the eDRX mode.

Other applications that can involve frequent updates (e.g., mobile-terminated connections or updates made by a dispatcher or an automated entity) and thus may benefit from use of the eDRX mode can include any or some of the following:

Dispatcher or automated entity frequently accessing a camera of a vehicle or cargo transportation unit.

Dispatcher or automated entity frequently accessing a sensor that detects a lock status of a door of a vehicle or cargo transportation unit.

Dispatcher or automated entity frequently performing safety checks of a vehicle or cargo transportation unit.

Dispatcher or automated entity frequently turning on or off any sensor of a vehicle or cargo transportation unit.

Example 5: Pairing Mode Between a Hub and Electronic Devices on Initial Installation Another example operation mode involves a mode where pairing is performed between an electronic device 102 (which behaves as a hub) and multiple sensors external to the electronic device. A hub can refer to any device external to the sensors that can establish links with multiple sensors to receive measurement data from the sensors and to transmit the measurement data to another entity.

The hub may associate and pair with multiple sensors using a short-range wireless link (sub-GHz/Bluetooth Low Energy (BLE), etc.) during a one-time initial installation process. For this operation mode, the hub has to be able to receive security credentials from a remote server (e.g., the server system 108 or another server) with low delay in order to conserve the battery life of the sensors during the association and pairing process. In this case, operating the hub in the eDRX mode until the association is completed (pertinent information is received from the remote server) would achieve better performance. In the eDRX mode, the hub waits for a command from the server to start scanning for sensors. This would be after the dispatcher or an automated entity has provisioned the correct keys, certificates, etc., at the hub from the server.

After the association is completed, the hub can transition to operate in the PSM mode to further conserve battery life of the hub (electronic device 102).

Example 6: Device Decides which State when it is in Pending Stop

An electronic device 102 can have various different states, such as a motion state (when the electronic device 102 is moving), a stopped state (when the electronic device 102 is stationary), and so forth.

The electronic device 102 can detect that it is pending stop, which means that the electronic device 102 has been in motion but a sensor (e.g., an accelerometer) has not detected motion for some specified time interval (e.g., seven minutes or other time interval). The idea of the pending stop period is to ensure that the device is properly stopped and to avoid prematurely doing a high energy consuming server update. In response to the accelerometer indicating no motion for the specified time interval, the electronic device 102 can indicate that it is pending stop. During pending stop, the device is physically in no motion and will collect a multitude of different sensor events during this time period. After the pending stop period is over (7 minute timer has expired), the device will transition to a stopped state assuming no motion and will do a server update. During the pending stop period different events can occur such as for example, door open/door close events, temperature out of range events, load detection, other sensor events, etc.

When the device is in pending stop, the electronic device 102 can determine whether it makes sense to operate the electronic device 102 in the eDRX mode or the PSM mode while the electronic device 102 awaits a server update (associated with a detection that the electronic device 102 has indeed transitioned from the motion state to the stop state). This can be determined based on the sensor events during the pending stop state and can be configured as such. For example, a temperature out of range event can be handled differently than multiple door events. A temperature out of range event may require the unit to accept an MT call, for example, so that a dispatcher can adjust the temperature. Hence, the device may use, e.g., the DRX or eDRX mode in this circumstance, but may, e.g., use the PSM mode where MT calls are not expected to be used. This pending stop state can dynamically configure the transceiver 204 (FIG. 2) differently depending on what other sensor events have happened in this pending stop state.

Example 7: Depending on Location Device can Determine which Features are Supported and Not Allow Configuration for Unsupported Features Another example operation mode is a location-based operation mode, such as based on a location (e.g., expressed as a latitude and longitude or other position information) of an electronic device 102 as determined from a GNSS based sensor or other type of location sensor.

Electronic devices 102 can move between numerous geographical locations at which wireless networks are associated with different MNOs. Wireless networks of different MNOs can support different features, such as different power consumption modes. One MNO may support a first set of power consumption modes and/or other features, while another MNO may support a different second set of power consumption modes and/or other features.

Electronic devices 102 will report back use of a power consumption mode used (e.g., regular DRX mode, eDRX mode, PSM mode, on-off mode, etc.) and supported capabilities of a corresponding wireless technology (e.g., cat M1/M2, cat NB1/NB2, EC-GSM-IoT, etc.) used.

The device-reported information can be stored in by the server system 108. The server system 108 can then enable only certain supported power consumption modes and other features based on the geographical location of a given electronic device 102. For example, if a first MNO does not support the NB-IoT radio interface, then the server system 108 can disable functions related to the NB-IoT radio interface when the given electronic device 102 is camped on a network of the first MNO. Alternatively, if a second MNO does not support the eDRX mode, then the server system 108 does not enable the eDRX mode for the given electronic device 102 when the given electronic device 102 is connected to a network of the second MNO.

As another example, a firmware of the transceiver 204 of the given electronic device 102 can support multiple radio interfaces, e.g., both NB-IoT and LTE-M. When the given electronic device 102 is stationary (e.g., determined by measurement data from an accelerometer), the given electronic device 102 can boot up with the NB-IoT firmware in the transceiver 204 if NB-IoT is known to be supported in the current location of the given electronic device 102. When the given electronic device 102 is in motion, the given electronic device 102 can load the LTE-M firmware into the transceiver 204 if LTE-M is known to be supported in the current location of the given electronic device 102.

A similar approach of using different radio interfaces can be applied when a given electronic device 102 is at a specific geographical location. For example, if the given electronic device 102 is located in a given country or region, the given electronic device 102 can boot up the NB-IoT firmware if NB-IoT networks or coverage are more prevalent than LTE-M networks or coverage in the given country or region. However, if the given electronic device 102 is located in another country or region, the given electronic device 102 boots up the LTE-M firmware if LTE-M networks or coverage are more prevalent than NB-IoT networks or coverage in the other country or region.

Example 8: Device Movement Across a Border

Another example operation mode involves an electronic device 102 crossing a border, such as a border between different public land mobile networks (PLMNs). A border may be a border between different countries, different provinces, different states, different geographic regions associated with different MNOs, and so forth.

In some cases, the electronic device 102 may have difficulty switching MNOs at a border, which can cause the electronic device 102 to timeout and have extended periods of lack of radio coverage. In other instances, the electronic device 102 remains on for a long time period scanning for an available network, and eventually can hit a maximum timeout period and turn off without successfully connecting to a network. For cases like this, it would be beneficial to optimize the handover at border crossings.

The electronic device 102 can determine when a border crossing (which can involve a handover between different PLMNs or MNOs) is approaching based on a location of the electronic device 102 (such as based on GNSS information). Based on determining that a border crossing is approaching, the electronic device 102 can be dynamically configured to operate in a border crossing mode to prevent or reduce the foregoing issues.

Some techniques to improve the border crossing handover include increasing the DRX period, obtaining new cell reselection information (visited PLMN to access, subscriber identity module or SIM profile to use, access point name or APN, etc.) from the server to assist with the handover. Also, the scanning timeout period can be increased from the default setting when at a border to prevent network timeouts and the device from going out of coverage.

Example 9: OTA Updates

Another operation mode is an OTA update operation mode. An OTA update involves updating software or firmware of an electronic device 102 over-the-air (i.e., using wirelessly transmitted information). Generally, an OTA update should be triggered only when the electronic device 102 is in a good radio coverage (e.g., high radio frequency (RF) link budget), is not roaming to a visited network, or can handover to a wireless local area network (WLAN) or an LTE-LAA (License Assisted Access) network, to ensure the least cost (battery and price) of the wireless connection. OTA updates can use larger packet sizes and larger bandwidth. This can, for example, be realized by enabling 3GPP Release 14 enhancements (e.g. higher performance modem categories or capabilities). For OTA updates, it may be desirable to not use the PSM or eDRX mode, to increase the bandwidth, to increase the number of resource blocks (RBs), to only trigger the update in strong received signal strength indicator (RSSI) conditions, or when stationary, as examples. The transceiver 204 can be configured to optimize the OTA operation mode so that the transceiver 204 does not disturb normal operation, e.g., when not in motion and no sensor events.

In some implementations, a secondary receive antenna path and multiple input multiple output (M IMO) communication may also be enabled, if such techniques are available, for better downlink performance and data rates.

Example 10: Device in a Low State of Charge

Another example operation mode is a low-charge operation mode, in which a battery of an electronic device 102 has a low charge.

The transceiver 204 of the electronic device 102 may consume the majority of the battery power. When the battery state of charge reading is low, the timers associated with the PSM mode, eDRX mode, or the on-off mode (discussed further above) can be adjusted (e.g., increased) so that time spent in sleep state is longer.

If the electronic device's battery is in a low state of charge, it may be beneficial to default to the PSM mode to save power, until the battery can be replaced.

In another implementation, a temperature sensor can tell the server system 108 when the temperature is below a threshold for safe battery and safe transceiver/device operating range. In this scenario, the transceiver 204 can be turned back on either when the temperature returns to a safe operating range or at a time specified by the server, where the server may have for example determined the time at which temperature is expected to rise above the required level for safe operation based on a weather report.

Example Parameters

A list of possible parameters that can be tuned or modified for each operation mode or profile is provided below. For example, a profile can include any or some combination of the following parameters. Although various example parameters are listed below, it is noted that in other examples, additional or alternative parameters can be used.

A power consumption mode parameter, to indicate use of any one or more of an on-off mode, a PSM mode, an eDRX mode, a combined mode.

A network technology parameter indicating a device category or a device class applicable to one or more network technologies to use, such as LTE-M: Cat-M1/M2, NB-IoT: cat-NB1/NB2, EC-GSM-IoT: coverage classes CC1 to CC5. In another example, a parameter can indicate that a transceiver can support software reconfigurability between LTE-M and NB-IoT. The network technology parameter can be set to a value that can be dynamically changed by the server system 108 based on an operation mode. For example, NB-IoT is more suited to static devices, while LTE-M is more suited to dynamic devices. In further examples, the network technology parameter can specify other radio access technologies or frequency bands of operation. Other radio access technologies include, for example, GSM (GSM EDGE Radio Access Network or GERAN), Universal Mobile Telecommunications System (UMTS) (UMTS Terrestrial Radio Access Network or UTRAN), LTE (Evolved UTRAN or E-UTRAN), and so forth.

T3412 timer (FIG. 4), which specifies a duration between TAU updates.

T3324 timer (FIG. 4), which specifies a duration when an electronic device 102 is to be in a DRX mode.

A power class parameter to indicate an output power of a transmission by an electronic device 102.

An extended coverage/range parameter that controls extended coverage operation corresponding to a maximum coupling loss (MCL) supported by an electronic device 102, such as to set a CE mode (CE mode A or CE mode B that relate in particular to the number of transmission repetitions) for LTE-M communications, set a CE level (that controls in particular a number of repetitions of the Physical Random Access Channel or PRACH), and so forth.

A parameter controlling a number of resource blocks (RBs).

A parameter controlling a bandwidth of operation. A bandwidth of operation refers to a channel bandwidth. LTE Release 8 supports multiple channel bandwidths such as 1.4 MHz (megahertz), 3 MHz, 5 MHz, 10 MHz, 15 MHz, and 20 MHz. LTE Release 10 adds carrier aggregation and component carriers to increase the channel bandwidth to 100 MHz. An LTE cat-M1 device category supports 1.4 MHz and a LTE NB-IOT device category supports 200 kHz (kilohertz). The 1.4 MHz channel bandwidth supports up to 6 RBs, and the 200 kHz channel bandwidth supports 1 RB. As an example, an electronic device 102 with the relevant capabilities can use this parameter to switch between 1.4 MHz and 200 kHz channel bandwidths (or between 6 RBs and 1 RB). In other examples, some device categories can support multiple bandwidths of operation. The parameter controlling the bandwidth of operation of a device can be modified depending on the operation mode from a profile provided by the server system 108.

A parameter to control use of half duplex or full duplex communications between an electronic device 102 and the wireless network 104.

A receive (Rx) diversity parameter to control Rx diversity. LTE cat-M and NB-IOT support only 1 main antenna. With LTE Release 8 for example, multiple antennas are supported so this parameter can enable a diversity Rx antenna if supported for higher throughput applications, such as an OTA update. This parameter can be modified depending on an operation mode from a profile provided by the server system 108. The hardware of the electronic device 102 can support multiple antennas.

A parameter controlling user plane/control plane optimizations. To optimize transmission of small amounts of data, control and user plane Evolved Packet System (EPS) optimizations can be performed. These can be implemented based on the operation mode and application needs and a current traffic model. Correct user/plane choices can lead to reduced signaling and therefore even more power optimization. An example of control plane optimizations includes transferring data between device and a Mobility Management Entity (MME) using control plane procedures, wherein the wide area connectivity to the server is provided by enabling date transfer between the MME and a service capabilities exposure function (SCEF) or a Packet Gateway. An example of a user plane optimization includes minimizing Radio Resource Control (RRC) signaling between an electronic device and an access node at idle-active transitions by using suspend/resume Radio Resource Control (RRC) procedures.

A parameter specifying use of UART versus USB control for the interface between the processor 202 and the transceiver 204 of an electronic device 102.

Example Profiles

The following are examples of various profiles (e.g., 112 and 122 in FIG. 1), sometimes referred to as operation mode profiles. The different profiles can specify different values of parameters or different combinations of parameters to improve device performance and power savings. Although various example profiles are listed, it is noted that in other examples, additional or alternative profiles can be used. Although the profiles listed below correspond to respective operation modes, it is noted that in other examples, a profile can be used in multiple operation modes.

The profiles can include:

A stationary-unloaded profile, which is used for an operation mode where an electronic device 102 is stationary and is attached to a vehicle or cargo transportation unit that is unloaded with cargo (i.e., does not contain cargo).

A stationary-loaded profile, which is used for an operation mode where an electronic device 102 is stationary and is attached to a vehicle or cargo transportation unit that is loaded with cargo.

A stationary-door event profile, which is used for an operation mode where an electronic device 102 is stationary and has detected a door event (e.g., door open or door closed).

A transit profile, which is used for an operation mode where an electronic device 102 is in motion. Multiple update cadences (periodicities) can be specified for this transit profile.

A door open/closed profile, which is used for an operation mode where an electronic device 102 has detected a door open or door closed event.

An air profile, which is used for an operation mode where an electronic device 102 is being transported in an aircraft.

A sea profile, which is used for an operation mode where an electronic device 102 is being transported in a watercraft.

A rail profile, which is used for an operation mode where an electronic device 102 is being transported in a railed vehicle.

An OTA software update profile, which is used for an operation mode where an electronic device 102 is to receive an OTA software update.

An emergency profile, which is used for an operation mode where an electronic device 102 in an emergency scenario.

Example Flow

Figure 6A:
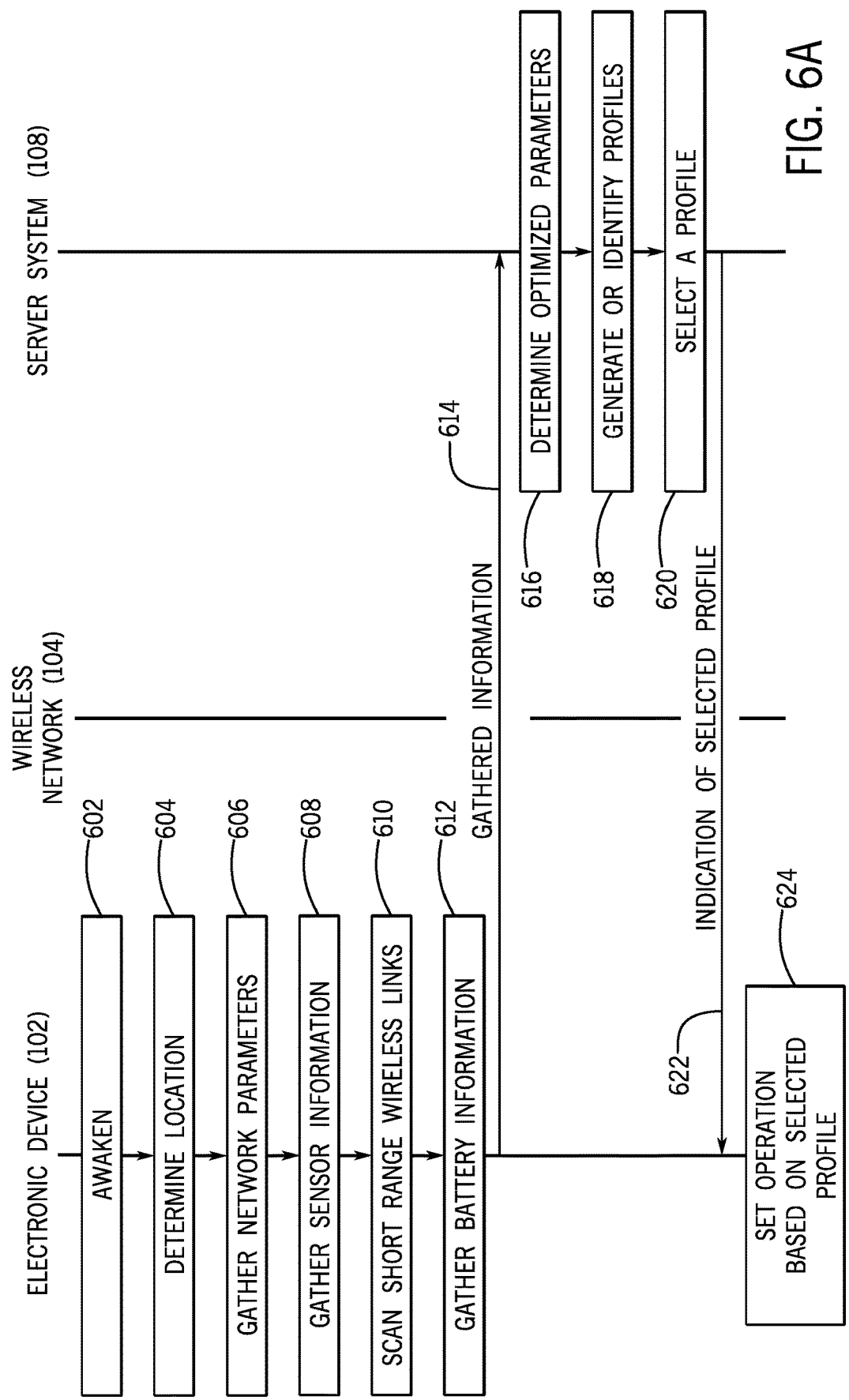
FIGS. 6A and 6B are flow diagrams of processes according to some implementations.

FIG. 6A is a message flow diagram that shows tasks of an electronic device 102 and of the server system 108. Note that in different examples, additional or alternative tasks can be performed. Also, the order of performance of tasks can be different from that shown in FIG. 6A, and some tasks depicted in FIG. 6A can be omitted.

The electronic device 102 awakens (at 602) from a low power state, such as the PSM mode or the off state of the on-off mode.

The electronic device 102 determines (at 604) its location using a position sensor, such as a GNSS based sensor.

The electronic device 102 gathers (at 606) various network parameters, such as any one or more of an information of a PLMN, information of various core network nodes (e.g., a serving gateway (S-GW) and an MME in an LTE core network), information of a tracking area, an RSSI or other thresholds, offsets or measurement information related to a signal strength, quality or interference, support for the PSM mode, and support for the eDRX mode. The various network parameters can be obtained by the electronic device 102 from system information broadcast by the wireless network 104 or other messaging sent by an access node 106 of the wireless network 104.

The electronic device 102 gathers (at 608) sensor information, including the sensors 214 of FIG. 2. For example, the sensor information can include information regarding motion (or lack of motion) of the electronic device 102, a temperature or other environment condition of an environment around the electronic device 102, and so forth.

The electronic device 102 also scans (at 610) short range wireless links, such as BLE links, Near Field Communication (NFC) links, etc. Scanning the short range wireless links allows for the electronic device 102 to identify any devices (such as sensors) in close proximity that the electronic device 102 should associate with. As part of scanning the short range wireless links, the electronic device 102 can obtain information of any devices that are in the proximity of the electronic device 102.

The electronic device 102 also gathers (at 612) battery information, including a level of the battery and a state of the battery.

The electronic device 102 sends (at 614) the pertinent information (this may include part or all of the gathered information listed above) to the server system 108.

The server system 108 uses the gathered information received from the electronic device 102 to determine (at 616) optimized parameters, including any of the parameters listed in the "EXAMPLE PARAMETERS" section above.

Using the determined optimized parameters, the profile selection engine 110 of the server system 108 may generate or identify (at 618) one or more profiles for an operation mode (or for multiple operation modes) determined for the electronic device 102 based on the information received from the electronic device 102.

The server system 108 can select (at 620) one of the generated or identified profiles. The selection of a profile may be based on a determination by the server system 108 of which profile is the most optimal profile given the operation mode(s) and other conditions of the electronic device 102 as reflected in the gathered information.

The server system 108 sends (at 622) an indication of the selected profile to the electronic device 102. The indication of the selected profile may comprise a combination of parameters instances characterizing the profile, such as, but not limited to, one or more of the parameters described above. Alternatively or in combination, one or more profiles might have been previously transmitted by the server system 108 and stored by the device 102, or might have been pre-configured or provisioned in the electronic devices 102. The indication can then be an index or other value that identifies the selected profile from among multiple possible profiles that have previously been transmitted to or pre-configured or provisioned in the electronic device 102.

The operation control engine 124 of the electronic device 102 can set (at 624) its operation based on the selected profile. For example, the electronic device 102 can select its power consumption mode based on the selected profile, and can further set one or more of the following operational characteristics: adjust a network setting such as a DRX cycle to receiving paging channels; adjust a TAU timing; change between use of LTE-M, NB-IoT, and EC-GSM-IoT technologies; control an extended coverage operation of the electronic device 102 based on the RSSI or the emergency profile; adjust a power class; determine when to turn on the processor 202 or to keep the processor 202 in a suspend state; use a dual Rx chain instead of a 1 Rx chain for an OTA update; and so forth.

Figure 6B:
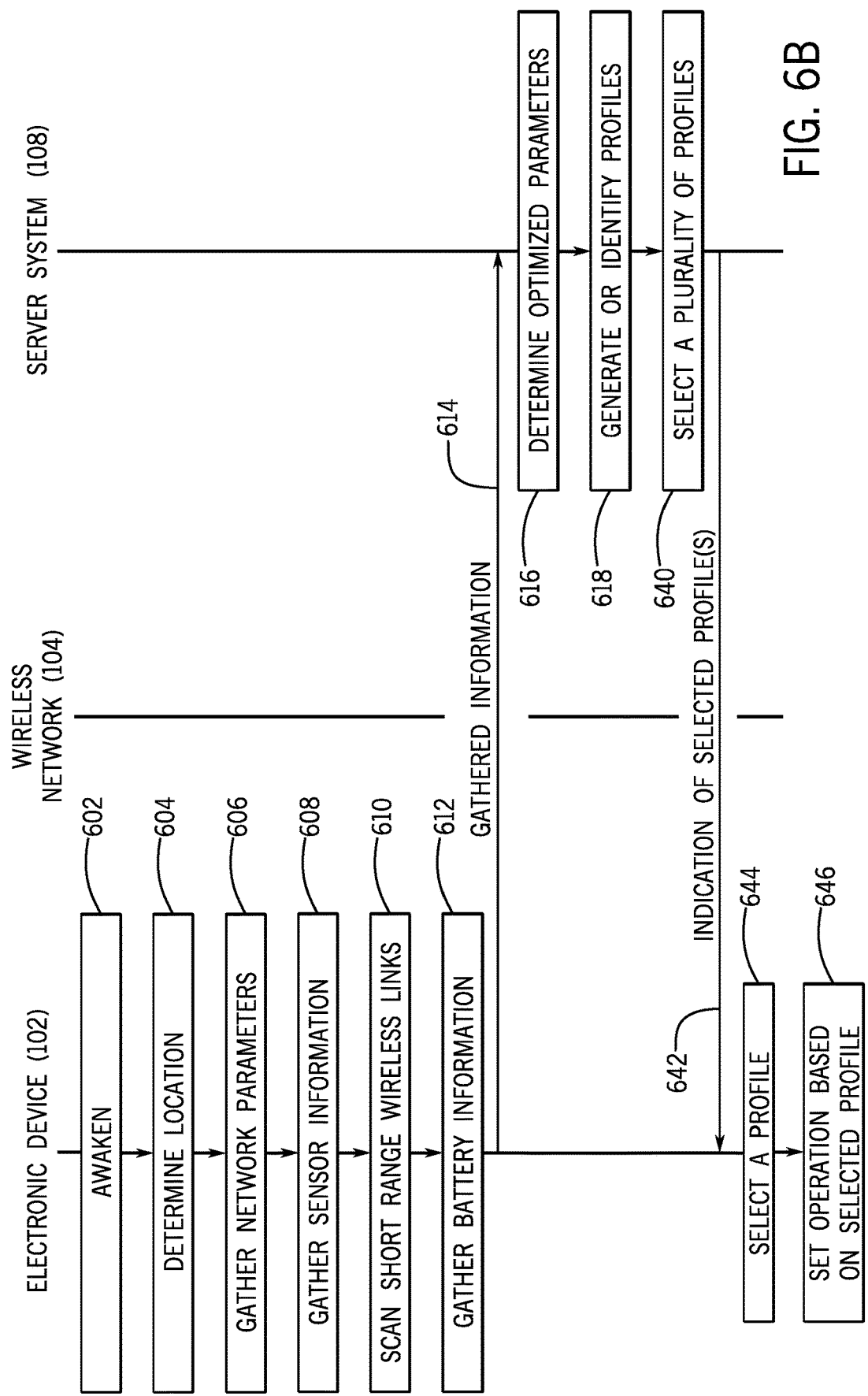

FIG. 6B shows another example implementation, which involves a process similar to the process of FIG. 6A, with some changes. Tasks in FIG. 6B that are similar to corresponding tasks in FIG. 6A share the same reference numerals. as the server system 108 can select (at 640) a plurality of profiles for the electronic device 102, corresponding to one or more power consumption modes and one or more operational parameter values sets, and can determine preferences or priorities associated to the related profiles. The selection of the plurality of profiles may be based on a determination by the server system 108 of which profiles are the most optimal profiles given the operation mode(s) under varying conditions of the electronic device 102. The determination of the preferences or priorities associated to the selected profiles may depend on the applicable use case(s), on wireless technologies and capabilities availability or preferences, on strategies aiming at reducing power consumption, and so forth.

In such an example implementation as described above, the server system 108 may send (at 642) an indication of the one or more selected profiles to the electronic device 102.

The operation control engine 124 of the electronic device 102 can then select (at 644) a profile (from among the indicated one or more selected profiles indicated by the indication sent at 642) to use at a given moment based on one or more factors selected from among: preferences or priorities associated to the indicated one or more selected profiles, local network technologies and device capabilities available, and other conditions that can be determined at the electronic device 102. The operation control engine 124 of the electronic device 102 can set (at 646) its operation based on the selected profile. As it can be appreciated, the electronic device 102 may not be required to perform one or more of steps 604 to 614. The electronic device 102 can autonomously select a profile and enter one or more of the indicated power consumption modes without further server interactions or indications, e.g., depending on local network capabilities or other operating parameters or conditions.

In another implementation, the server system 108 may generate (at 618), select (at 620 or 640) and send to the electronic device 102 (at 622 or 642) one or more sets of parameter values, without the one or more sets being constituted or identified as profiles. As one can appreciate, the operations applicable to profiles described elsewhere in the present application would apply in a similar manner to the parameter values sets.

System Architecture

In examples where the various tasks discussed above are implemented using machine-readable instructions, the machine-readable instructions are executable on a processor to perform the various tasks. Machine-readable instructions executable on a processor can refer to the instructions executable on a single processor or the instructions executable on multiple processors.

A non-transitory machine readable or computer readable storage medium can store machine-readable instructions. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of an electronic device comprising a processor and a transceiver, the method comprising:
   storing, in a storage, a plurality of profiles relating to respective different operation modes of the electronic device, the plurality of profiles specifying different power consumption modes;
   receiving, from a server over a network and through the transceiver, an indication of a selected profile from among the plurality of profiles;
   selecting a power consumption mode of the electronic device using the selected profile based on an operation mode of the electronic device, the selected power consumption mode specified by the selected profile being different from a discontinuous reception (DRX) mode; and
   powering off, by the electronic device for an entire duration of the selected power consumption mode, the processor and at least a portion of the transceiver while the electronic device is in the selected power consumption mode, wherein in the selected power consumption mode the electronic device remains registered with the network, and the electronic device is not reachable, responsive to a connection requested by the network, during the entire duration of the selected power consumption mode.

2. An electronic device comprising:
   a storage to store a plurality of profiles relating to respective different operation modes of the electronic device, the plurality of profiles specifying different power consumption modes, wherein a first power consumption mode specified by a first profile of the plurality of profiles is different from a discontinuous reception (DRX) mode;
   at least one processor configured to:
      receive, from a server over a network, an indication identifying at least the first profile from among the plurality of profiles based on a given operation mode;
      select the first power consumption mode of the electronic device using the first profile; and
   a communication transceiver, wherein in the first power consumption mode specified by the first profile, the electronic device powers off the processor and at least a portion of the communication transceiver, and remains registered with the network, and wherein in the first power consumption mode the electronic device is not reachable, responsive to a connection requested by the network, during an entire time length of the first power consumption mode.

3. The electronic device of claim 2, wherein the first power consumption mode is a power save mode (PSM), and a second power consumption mode of the different power consumption modes is a combined mode comprising the PSM and an extended discontinuous reception (eDRX) mode, the eDRX mode different from the DRX mode.

4. The electronic device of claim 3, wherein the different power consumption modes further comprise:
   an off mode in which the electronic device is to power off the processor and the communication transceiver,
   wherein in the eDRX mode of the combined mode, the electronic device is to cause the communication transceiver to activate every specified period from an inactive state to receive information from the network.

5. The electronic device of claim 2, wherein the at least one processor is configured to receive the plurality of profiles from the server that is remote from the electronic device.

6. The electronic device of claim 5, wherein the at least one processor is configured to:
   send information to the server,
   wherein the plurality of profiles received from the server are based on the information sent by the electronic device to the server.

7. The electronic device of claim 2, wherein priorities are associated with the different power consumption modes, and wherein the at least one processor is configured to select the first power consumption mode according to the priorities.

8. The electronic device of claim 2, wherein priorities are associated with respective profiles of the plurality of profiles, and wherein the at least one processor is configured to select the first profile from the plurality of profiles based on the priorities.

9. The electronic device of claim 2, wherein the at least one processor is configured to:
   determine if the network supports the first power consumption mode, wherein the at least one processor is configured to select the first power consumption mode responsive to determining that the network supports the first power consumption mode.

10. The electronic device of claim 9, wherein the at least one processor is configured to:
    in response to determining that the network supports the first power consumption mode, obtain, over the network, a parameter for the first power consumption mode.

11. The electronic device of claim 10, wherein the parameter comprises a value of a timer.

12. The electronic device of claim 2, wherein the at least one processor is configured to select the first power consumption mode in response to awakening the electronic device or in response to selecting a cell by the electronic device.

13. The electronic device of claim 2, wherein the first profile is selected at the server based on one or more of a condition of the network, a parameter assigned by the network, a location of the electronic device, a motion status of the electronic device, an operator of the network, a condition of a battery of the electronic device, a type of data operation, a condition of an environment around the electronic device, and a capability of the network.

14. The electronic device of claim 2, wherein the different operation modes are selected from the group consisting of: an operation mode involving low frequency updates by the electronic device, an operation mode involving high frequency updates by the electronic device, an operation mode in which the electronic device exhibits low or no motion, an operation mode involving a remote update or control of a system including the electronic device, an operation mode where the electronic device is pairing with another device, an operation mode involving a pending change in motion of the electronic device, an operation mode involving crossing a border between different public land mobile networks (PLMNs), an operation mode involving over-the-air update of the electronic device, an operation mode involving an estimated reduced battery lifetime.

15. The electronic device of claim 2, wherein the at least one processor is configured to further:
    select a parameter relating to operation of the electronic device based on the first profile, the parameter comprising at least one selected from the group consisting of: a value of a timer, a power class, an extended coverage control parameter, a number of resource blocks, a bandwidth of operation, a frequency band, information indicating use of half duplex or full duplex communication, receive diversity, information relating to a user plane or control plane optimization, information specifying a type of interface between the processor and the communication transceiver of the electronic device, and a tracking area update (TAU) period.

16. The electronic device of claim 2,
a wherein the communication transceiver is to communicate over the network, and the electronic device further comprises:
a tri-state buffer connected between the processor and the communication transceiver.

17. The electronic device of claim 2, wherein the indication received from the server identifies multiple profiles of the plurality of profiles, and the at least one processor is configured to:
select the first profile from among the multiple profiles based on one or more factors.

\* \* \* \* \*